United States Patent
Lu et al.

(10) Patent No.: US 10,082,868 B2
(45) Date of Patent: Sep. 25, 2018

(54) CALCULATION METHOD OF LINE-OF-SIGHT DIRECTION BASED ON ANALYSIS AND MATCH OF IRIS CONTOUR IN HUMAN EYE IMAGE

(71) Applicant: BEIHANG UNIVERSITY, Beijing (CN)

(72) Inventors: Feng Lu, Beijing (CN); Xiaowu Chen, Beijing (CN); Qinping Zhao, Beijing (CN)

(73) Assignee: BEIHANG UNIVERSITY, Beijing (CN)

( * ) Notice: Subject to any disclaimer, the term of this patent is extended or adjusted under 35 U.S.C. 154(b) by 97 days.

(21) Appl. No.: 15/413,165

(22) Filed: Jan. 23, 2017

(65) Prior Publication Data

US 2017/0293354 A1    Oct. 12, 2017

(30) Foreign Application Priority Data

Apr. 9, 2016    (CN) .......................... 2016 1 0218355

(51) Int. Cl.
*G06K 9/00*    (2006.01)
*G06F 3/01*    (2006.01)

(52) U.S. Cl.
CPC ......... *G06F 3/013* (2013.01); *G06K 9/00228* (2013.01); *G06K 9/00604* (2013.01)

(58) Field of Classification Search
CPC . G06F 3/013; G06K 9/00228; G06K 9/00604
See application file for complete search history.

(56) References Cited

U.S. PATENT DOCUMENTS 9,811,729 B2 * 11/2017 Santos-Villalobos .................. G06K 9/0061
9,983,709 B2 *  5/2018 Trail ......................... G06T 7/70
(Continued)

FOREIGN PATENT DOCUMENTS

CN    104182723 A    12/2014
CN    104615978 A     5/2015
(Continued)

OTHER PUBLICATIONS

Zhang, Wen et al., "Gaze estimation based on extracted parameter of one iris" Journal of Optoelectronics Laser; vol. 22, No. 6; (Jun. 2011); pp. 916-920.
(Continued)

*Primary Examiner* — Kevin Ky
(74) *Attorney, Agent, or Firm* — J.C. Patents

(57) ABSTRACT

The invention provides a calculation method of line-of-sight direction based on analysis and match of iris contour in human eye image, including: a data driven method, for stable calculation of 3D line-of-sight direction via inputting human eye image to be matched with synthetic data of virtual eyeball appearance; two novel optimization matching criterions of eyeball appearance, which effectively reduce effects of uncontrollable factors, such as image scaling and noise on results; a joint optimization method, for the case of continuously shooting multiple human eye images, to further improve calculation accuracy. One application of the invention is virtual reality and human computer interaction which is under the principle that shooting eye images of a user and calculating line-of-sight direction of user to enable interaction with intelligent system interface or virtual realistic object. The invention can be widely used in training, games and entertainment, video surveillance, medical care and other fields.

6 Claims, 4 Drawing Sheets

(56) References Cited

U.S. PATENT DOCUMENTS

| | | | |
|---|---|---|---|
| 9,990,562 B2* | 6/2018 | Aisaka | G06K 9/48 |
| 2002/0181115 A1* | 12/2002 | Massof | G02B 27/017 |
| | | | 359/630 |
| 2003/0098954 A1* | 5/2003 | Amir | A61B 3/113 |
| | | | 351/210 |
| 2006/0045317 A1* | 3/2006 | Adachi | G06K 9/00248 |
| | | | 382/118 |
| 2006/0133672 A1* | 6/2006 | Li | G06K 9/00248 |
| | | | 382/190 |
| 2009/0141940 A1* | 6/2009 | Zhao | G06K 9/00295 |
| | | | 382/103 |
| 2009/0315974 A1* | 12/2009 | Matthews | H04N 7/144 |
| | | | 348/14.08 |
| 2010/0074477 A1* | 3/2010 | Fujii | G06K 9/00604 |
| | | | 382/117 |
| 2010/0290668 A1* | 11/2010 | Friedman | G06K 9/00255 |
| | | | 382/103 |
| 2013/0083062 A1* | 4/2013 | Geisner | G02B 27/017 |
| | | | 345/633 |
| 2013/0114043 A1* | 5/2013 | Balan | G02B 27/017 |
| | | | 351/210 |

FOREIGN PATENT DOCUMENTS

| | | |
|---|---|---|
| CN | 104809424 A | 7/2015 |
| EP | 2 149 856 A2 | 2/2010 |
| EP | 2 338 416 A1 | 6/2011 |

OTHER PUBLICATIONS

The Chinese First Examination Report of corresponding China patent application No. 201610218355.7, dated Feb. 24, 2018.

* cited by examiner

CALCULATION METHOD OF LINE-OF-SIGHT DIRECTION BASED ON ANALYSIS AND MATCH OF IRIS CONTOUR IN HUMAN EYE IMAGE

CROSS-REFERENCE TO RELATED APPLICATION

This application claims priority to Chinese Patent Application No. 201610218355.7, filed on Apr. 9, 2016 and entitled "CALCULATION METHOD OF LINE-OF-SIGHT DIRECTION BASED ON ANALYSIS AND MATCH OF IRIS CONTOUR IN HUMAN EYE IMAGE", which is hereby incorporated by reference in its entirety.

TECHNICAL FIELD

The present invention relates to the field of computer vision and image processing, and in particular, is a calculation method of line-of-sight direction based on analysis and match of iris contour in human eye image.

BACKGROUND

Line-of-sight tracking/eye-movement tracking holds great significance for the understanding of user behavior and efficient human-computer interaction. More than 80% of information perceptible to human is received by the human eye, of which more than 90% is processed by the visual system. Therefore, the line-of-sight sheds great light on reflecting the interaction process between human and the outside world. In recent years, value of the line-of-sight tracking technology in application gradually stand out, thanks to the rapid development of virtual reality technology and human-computer interaction technology; on the other hand, calculation of the line-of-sight direction remains a great challenge in the field of computer vision. Up until now, the solution has mostly been based on active light source and infrared camera, which requires additional hardware, and demanding conditions of the application environment. In one alternative method, a single camera is employed for shooting a human eye image prior to calculation of the line-of-sight direction, eliminating the need for assuming the active illumination, however, a large number of training samples are required to be obtained in advance, for the sake of conducting learning and deriving a regression calculation model. For example, an early-stage neural network system, proposed by Baluja and Pomerleau, requires the use of thousands of training samples for training. Tan et al., proposed a method based on local linear interpolation, in which the eye image and coordinates of the line-of-sight undergo mapping, a system which needs about 200 training samples.

In order to reduce the demand on the number of training samples, Williams et al. proposed a semi-supervised method capable of simultaneously utilizing both labeled samples and unlabeled ones for training. Lu et al. proposed a self-adaptive regression framework based on sparse optimization, which allows the use of fewer training samples for calculation, and is able to address a series of related issues in the calculation of line-of-sight at the same time. Sugano et al. adopted a method to automatically generate training samples, before applying them to system training, via extracting visual saliency from videos. The above methods are disadvantageous in that, the position of the head is assumed to be fixed; and more training samples are in need to solve the problem of head movement, if the methods are to work under the condition in which the position of the head changes.

In order to completely avoid system training, Yamazoe et al. and Heyman et al. came up with a method to realize the calculation of line-of-sight via calculating the position of the iris center relative to the eyeball center, considering that the line-of-sight direction is determined solely by eyeball orientation, which is obtainable by calculation of the orientation of the iris disc or the central position thereof. Their method requires 3D modeling of the head, and precise tracking of 3D feature points of the face, including the position of an eye corner and the central position of the eyeball. In practice, these feature points are usually difficult to precisely extract, sometimes even invisible. Ishikawa et al. utilized a method to track facial feature points based on active appearance model (AAM), which also encountered the same problem. In some other methods, an ellipse is employed to fit the iris contour, before the ellipse is subject to reverse projection to form a circle in 3D space. The method derives from the fact that the iris contour can be regarded as an approximate circle, the projection of which in a two-dimensional image is elliptical, and it is possible for the orientation of the iris in a 3D world to be worked out via analysis of the elliptical shape. This method is common as one based on the shape of the iris contour. However, the traditional iris contour analysis method may not be reliable in practical application. What accounts for this is that, in an image, the iris region is small in area while large in noise, rendering a precise extraction of the contour very difficult, adding to the fact that a nuanced error in a few pixels extracted from the contour is all that is required to cause enormous deviation in the calculation of line-of-sight. Therefore, in many cases, the only choice is to shoot a human eye image with ultra-high resolution, or to use a wearable camera to improve the precision, which raises the requirements for hardware and imposes further restrictions on practical application scenarios. Given the aforementioned methods, the present invention provides a calculation method of line-of-sight direction based on analysis and match of iris contour in human eye image, in which virtual generation of the appearance of the iris is combined, mainly for overcoming the problem of poor stability and low precision of the traditional iris contour matching method, concerning a normal-resolution human eye image that has been shot, so as to realize high precision calculation of 3D line-of-sight.

SUMMARY

According to the actual needs and technical problems mentioned above, the present invention is intended to: provide a calculation method of 3D line-of-sight, via fitting virtual eyeball appearance, generate dataset of virtual eyeball appearance under different line-of-sight directions, and via matching with a human eye image, realize calculation of 3D line-of-sight direction of human eye. The method has no additional requirement for the system, and only uses the human eye image shot by a single camera as input. Meanwhile, the present method realizes better robustness, compared with other similar method, via proposing two technologies for analyzing and matching the shape of the iris contour.

Technical solutions of the present invention: a calculation method of line-of-sight direction based on analysis and match of iris contour in human eye image, firstly, concerning obtaining the human eye image, the present invention includes the following processes: using a single camera to shoot an image including the facial region of a user; fixing on a left-eye or right-eye region using an existing face analysis method; pre-treating the extracted human eye image to obtain an image after brightness correction, and generating pixels on partial iris edge via edge detection.

Secondly, a method is invented for synthesizing virtual eyeball appearance and establishing dataset for different line-of-sight directions: establishing a 3D sphere model for the eyeball, and adding important details such as iris contour thereon; traversing physically feasible eyeball orientation parameters, namely, rotation angles around the horizontal and vertical axes, for each of the eyeball orientation, projecting corresponding 3D virtual eyeball appearance to a 2D plane (corresponding to the direction straight ahead of the eyeball), and recording the 2D coordinate information, such as the iris form, central position of the eyeball, and iris central position after the projection; and storing all the rotation angles and the correspondingly generated 2D coordinate information in a dataset.

Further, a method is invented to match the human eye image with the synthetic virtual eyeball appearance, wherein via maximizing the matching degree, selecting virtual eyeball appearance which is the most consistent with the human eye image, obtain the corresponding eyeball orientation and position. Concerning matching of the eyeball appearance, matching algorithms for the constraints based on both the measurement of circular symmetry and the measurement of iris contour matching degree are invented: regarding the former one, specifying any one group of matching parameters (relative translation and the eyeball orientation), and determining coordinates of the corresponding iris contour of the virtual eyeball and the iris central position; overlapping the coordinates onto the human eye image, conducting measurement of the variation pattern of the pixel gradient of the human eye image in the proximity of the iris contour, studying 2D circular symmetry with the elliptic contour of the iris as reference, and using the result as a criterion to measure the matching effect; regarding the latter one, specifying any one group of matching parameters (relative translation and the eyeball orientation), and determining coordinates of the corresponding iris contour of the virtual eyeball; traversing the pixels on the iris edge extracted from the human eye image, calculating distances between the edge pixels and the iris contour of the virtual eyeball; examining distribution of the distances, and counting the number of the distances which are significantly different from the others, and the less the number is, the better the measurement result of the iris contour matching degree.

Additionally, regarding the continuously shot human eye images, on the condition that the central position of the eyeball remains unchanged or has been aligned, a joint optimization method is invented, and is capable of improving the accuracy of calculating the line-of-sight direction from multiple human eye images. On the basis of the above matching result of the human eye image with the virtual eyeball appearance, for each human eye image, respectively calculate to obtain the eyeball orientation and the coordinates of the eyeball central position; and for the result of all the images, excluding the eyeball central coordinates with obvious deviation, and conducting weighting calculation of standard coordinates of the eyeball center using the remaining coordinates; individually carrying on with the appearance matching, while adding one optimization constraint, namely, the matched eyeball central coordinates coincide as much as possible with the standard eyeball central coordinates, namely, the matched eyeball central coordinates coincide as much as possible with the standard eyeball central coordinates. The calculation result is updated as the final result of the eyeball orientation in each human eye image.

The specific implementation steps of the present invention are as follows:

(1) constructing a sphere eyeball model, traversing all eyeball orientations with different physical feasibilities, generating 2D virtual eyeball appearances with different orientations via geometric calculation, and storing all the eyeball orientations and corresponding virtual eyeball appearance data in a dataset, for use in specific applications;

(2) during application, firstly shooting a facial image of a user, fixing on a left-eye or right-eye region, pre-treating the human eye image, completing brightness correction and extracting pixels on iris edges in the human eye image;

(3) regarding the shot and pre-treated human eye image and the virtual eyeball appearance data in the dataset, matching the human eye image with the virtual eyeball appearance data via a matching optimization algorithm of the human eye image and the virtual eyeball appearance data, where a matching result determines orientation and position of the eyeball which best match with the human eye image; and (4) regarding continuously shot human eye images, further conducting joint optimization on the basis of the eyeball appearance matching in step (3), on the condition that the central position of the eyeball remains unchanged, or that the human eye images have been aligned, and precisely and simultaneously calculating 3D line-of-sight direction corresponding to each image.

A method for generating the virtual eyeball appearance data in step (1) is as follows: firstly, establishing a 3D sphere model of the eyeball, and adding important elements of a circular iris contour on the surface of the 3D sphere model; traversing eyeball orientations varying in physical feasibilities which is different rotation angles around the horizontal and vertical axes, for each of the rotation angles, projecting corresponding 3D virtual eyeball appearance to a 2D plane which is to a position just in front of the corresponding eyeball, and recording the projected 2D eyeball appearance data of iris contour coordinates, eyeball central coordinates and iris central coordinates; and storing all the eyeball orientations and the virtual eyeball appearance data corresponding to the eyeball orientations in the dataset.

The matching optimization algorithm of the human eye image and the virtual eyeball appearance data in step (3) is as follows: matching parameters to be calculated are relative translation amount of the human eye image and the virtual eyeball appearance in a 2D image domain, and the eyeball orientation corresponding to the virtual eyeball appearance, and optimizing matching degree of the human eye image and the virtual eyeball appearance via finding the best values of the two matching parameters, so as to realize matching of the human eye image and the virtual eyeball appearance data.

The matching degree is calculated by the following functional measurements:

(31) measurement of circular symmetry: pixels in the proximity of the virtual eyeball iris contour in the human eye image have better circular symmetry, when the matching tends to become ideal;

(32) measurement of iris contour matching degree: calculating distances between pixels on the iris edge in the human eye image and the virtual eyeball iris contour, when the matching tends to become ideal, and the distances tend to become equal.

A method for conducting the measurement of the circular symmetry in step (31) is as follows: coordinates of the iris contour of the virtual eyeball appearance and coordinates of the central position of the iris corresponding to any one group of matching parameter may be determined; overlapping these coordinates onto the human eye image, via continuously sampling values of pixels on the human eye image, along both the positive and negative directions indicated by lines connecting the iris center of the virtual eyeball appearance and points on the iris contour, while taking the points as reference, so as to obtain 1D pixel column vectors, and the sampling region is proportional to the distances between the points on the iris contour of the virtual eyeball appearance and the iris center of the virtual eyeball appearance; sampling via traversing the points on the iris contour of the virtual eyeball appearance, and combining all the obtained 1D column vectors into a 2D matrix; and finally, calculating distribution consistency of each column of numeric of the matrix or a gradient matrix of the matrix in the vertical direction, the consistency may be measured in a matrix kernel function, the correlation coefficient of each column, the concentration of singular values, and the higher the consistency, the better the circular symmetry.

A method for conducting the measurement of the iris contour matching degree in step (32) is as follows: regarding any one group of matching parameters, determining coordinates of the iris contour of the virtual eyeball appearance corresponding to the matching parameters of the group; traversing the pixels extracted from the iris edge of the human eye image, and calculating the distances between the edge pixels and the iris contour of the virtual eyeball appearance; and reviewing distribution of the distances, in which the less the number of the distances which are significantly different from the others in a statistic sense, the better the measurement result of the iris contour matching degree.

A method for the joint optimization in step (4), and the method for accurately calculating the 3D line-of-sight direction corresponding to each image simultaneously are as follows: under the assumption that central position of the eyeball remains unchanged or has been aligned when the images shot, conducting the matching of the human eye images with the virtual eyeball appearance in step (3), and calculating the eyeball orientation corresponding to each human eye image and the coordinates of the central position of the eyeball; excluding the central coordinates of the eyeball with obvious deviation therein, and conducting weighting calculation of standard coordinates of the eyeball center using the remaining coordinates; and individually carrying on with the optimization in step (3), while adding one optimal constraint, namely, coinciding the matched eyeball central coordinates as much as possible with the standard eyeball central coordinates, and updating the calculation results as the eyeball orientations in the human eye images, namely, the final results of the 3D line-of-sight direction.

Compared with the other method based on iris appearance analysis, the beneficial characteristics of the present invention lie in that: (1) a data driven method is invented, and via synthesis of virtual and physically feasible eyeball appearance data, the calculation of line-of-sight direction is transformed into a problem of matching a real human eye image with the synthetic multiple orientation virtual eyeball appearance, which is conducive for a stable calculation; (2) concerning the iris appearance matching, two novel optimization criterions are invented, including a measurement criteria of circular symmetry and a measurement criteria of iris contour matching degree, which differ from a traditional method in that, rather than requiring exact coincidence with the iris contour, the matching is capable of flexibly measuring the similarity of the iris contour in shape, so as to efficiently reduce the effects of uncontrollable factors, such as image scaling and noise on the results; and (3) in the case of continuously shooting multiple human eye images, and under the assumption that central position of the eyeball remains unchanged or has been aligned, the present invention proposes a joint optimization method, which is capable of respectively calculating the line-of-sight direction more accurately from multiple human eye images.

DESCRIPTION OF EMBODIMENTS

Specific implementations of the present invention will be described in detail below in conjunction with the accompanying drawings.

Figure 1:
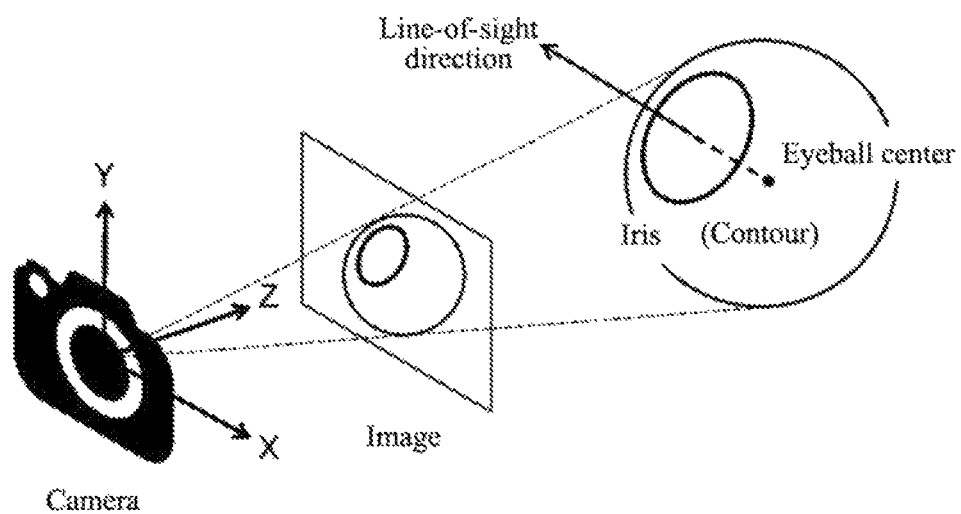
FIG. 1 is a diagram illustrating a relationship between an iris image and a line-of-sight direction according to the present invention.

Referring to FIG. 1, which is a diagram illustrating a relationship between an iris image and a line-of-sight direction according to the present invention, a simple 3D sphere model is employed to establish a model of an eyeball, in order to calculate a 3D line-of-sight direction of a human eye image shot by a camera. Specifically, the eyeball is considered to be a standard sphere with circular iris region on the surface, and as to the eyeball model, the model parameters only include the radius of the eyeball and the diameter of the iris, and is hence easy to analyze and calculate. On such basis, line-of-sight direction may be determined by using a ray approximately starting from the eyeball center and through the iris center. On the other hand, it is known from a basic law of 3D geometry that, in this model, the line-of-sight direction is consistent with the direction of a normal vector of the circular iris region. Therefore, the problem of calculating the 3D line-of-sight direction can be transformed into one of calculating the orientation (the normal direction) of the iris region.

When a camera is used to shoot human eye appearance, the iris contour, which is originally circular, is rendered elliptical in the image due to perspective. It is easy to prove that, when movement of a 3D eyeball leads to change in the iris orientation, the shape of elliptical projection of the iris contour is directly determined by the iris orientation. For example, when the eyeball and the iris are directly facing a shooting direction, the shot 2D iris contour is of standard circular shape; and if the eyeball rotates, the iris orientation rotates along with the eyeball, resulting in contraction of the 2D image thereof after projection along the rotating direction, and the projected 2D image is presented as an ellipse contracted along its short axis. Accordingly, 3D orientation of the iris may be restored via calculating the shape of the elliptical iris contour (determined by the long axis and the short axis). As a result, the problem of calculating the 3D line-of-sight direction from a human eye image may eventually be transformed into analysis and calculation of a 2D iris contour in an image.

Figure 2:
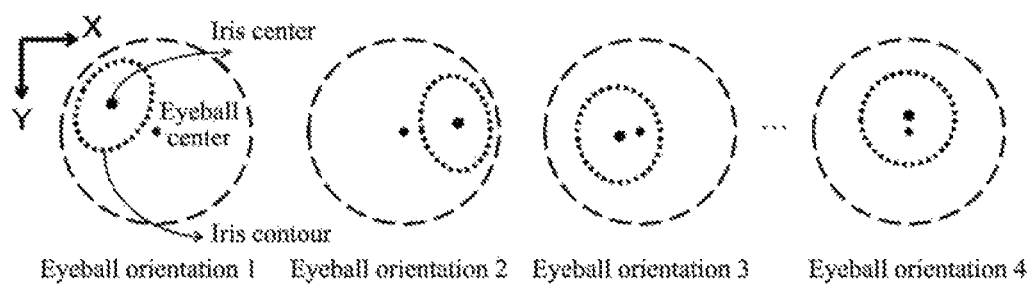
FIG. 2 is a diagram illustrating generation of virtual eyeball appearance according to the present invention.

Referring to FIG. 2, which is a diagram illustrating generation of virtual eyeball appearance according to the present invention, a method is proposed to conduct calculation and drawing based on a 3D sphere eyeball model, in order to avoid generating a large amount of virtual eyeball appearance data with physical feasibility, without performing actual shooting. Firstly, a parameterization scheme is determined for generating virtual data. Specifically, the eyeball orientation is taken as indicators, and is further decomposed into two rotating manners of the eyeball around an X axis and a Y axis. Marking rotation angles of the two directions as u and v, respectively, and the overall rotation angle of the eyeball may be approximated as arcsin ((sin$^2$ u+sin$^2$ v)$^{-2}$). Herein, it is taking into consideration that generation of the virtual eyeball appearance shall guarantee the physical feasibility, therefore, a constraint is imposed on the rotation, requiring the overall rotation of the eyeball not exceeding 45°, namely, (sin$^2$ u+sin$^2$ v)$^{-2}$<sin 45°. On such a basis, the sampling is conducted once every 5° regarding u and v, and as to each group of u and v, a group of u and v shall be abandoned if the overall rotation exceeds 45°, judged by the above equation, otherwise the group of data shall be added to a synthetic parameter set of the virtual eyeball.

Conduct synthesis of the eyeball virtual appearance, regarding each group of physically feasible rotation angles u and v of the eyeball. As mentioned above, the scheme adopts the standard sphere as an approximation of the eyeball. Meanwhile, a standard circle is attached to the surface of the sphere, as an approximation of the iris contour. The two approximations as a whole compose a 3D model of the eyeball. In the specific construction, diameters of the eyeball and the iris are respectively marked as $D_e$ and $D_i$, and values thereof refer to standard parameters of the eyeball in the anatomy, namely, 25 mm and 12 mm, respectively. It needs to be added that, individual differences among different people lead to differences in $D_e$ and $D_i$. Though fixed parameters are adopted by the present invention during model construction of the virtual eyeball appearance herein, the individual differences are able to be effectively dealt with by the following algorithm.

The virtual eyeball appearance data in the case of different line-of-sight directions may be generated, by using the eyeball model, combining the aforementioned synthetic rotation parameters of the virtual eyeball. Firstly, making $g=[g_x, g_y, g_z]^T$ as a 3D unit vector for describing the eyeball orientation (i.e., the 3D line-of-sight direction), and in regard to any physically feasible u and v, a calculation method of the corresponding g is as follows:

$$g = \begin{bmatrix} \sin u \\ \sin v \\ (1 \; \sin^2 u \; \sin^2 v)^{-2} \end{bmatrix}$$

At the same time, 3D coordinates of the eyeball center, the iris center and the i$^{th}$ point on the iris contour are respectively marked as E(g), C(g), P$_i$(g), for the sake of calculating the virtual eyeball appearance under the eyeball orientation. And the relationship between E(g), C(g), P$_i$(g) and g may be calculated by the following equation:

$$C(g) = \begin{bmatrix} 1 & 0 & 0 \\ 0 & \cos\beta & \sin\beta \\ 0 & \sin\beta & \cos\beta \end{bmatrix} \begin{bmatrix} \cos\alpha & 0 & \sin\alpha \\ 0 & 1 & 0 \\ \sin\alpha & 0 & \cos\alpha \end{bmatrix} \left( E(g) + \begin{bmatrix} 0 \\ 0 \\ D_e/2 \end{bmatrix} \right)$$

$$P_i(g) = \begin{bmatrix} 1 & 0 & 0 \\ 0 & \cos\beta & \sin\beta \\ 0 & \sin\beta & \cos\beta \end{bmatrix} \begin{bmatrix} \cos\alpha & 0 & \sin\alpha \\ 0 & 1 & 0 \\ \sin\alpha & 0 & \cos\alpha \end{bmatrix} \left( E(g) + \begin{matrix} D_i/2 \; \sin\gamma \\ D_i/2 \; \cos\gamma \\ \left(\frac{D_e^2}{4} \; \frac{D_i^2}{4}\right)^{-2} \end{matrix} \right)$$

Where, $$\alpha = \arctan\left(\frac{g_x}{g_z}\right),$$

$$\beta = \arctan\left(\frac{g_y}{g_z}\right),$$

and $g_x$, $g_y$ and $g_z$ are respectively components of the above line-of-sight direction g along three coordinate axes. γ is azimuth of the i$^{th}$ point on the iris contour relative to the iris center. Thus, regarding any physically feasible u and v, under the given 3D coordinates E(g) of the eyeball center, the 3D coordinates of the corresponding eyeball orientation g, the iris center C(g) and the iris contour {P$_i$(g)} have all be obtained via calculation. 3D coordinates for describing the virtual eyeball appearance under a series of different eyeball orientations, may be calculated, via traversing all the physically feasible eyeball rotation angles u and v.

Finally, in order to synthesize the virtual eyeball appearance of a 2D image, 3D coordinates need to be transform into 2D pixel coordinates on the image plane. And the following calculation is conducted using a standard camera imaging equation:

$$z \begin{bmatrix} p \\ 1 \end{bmatrix} = K \begin{bmatrix} 1 & 0 & 0 & 0 \\ 0 & 1 & 0 & 0 \\ 0 & 0 & 1 & 0 \end{bmatrix} \begin{bmatrix} P \\ 1 \end{bmatrix}$$

Wherein, the capital letter P generally refers to any known 3D coordinates, and may be the aforementioned E(g), C(g), P$_i$(g). The small letter p refers to 2D pixel coordinates on the corresponding image. K is an intrinsic matrix of the camera, and may be calibrated via experiment, or be specified according to the real situation. z is a proportionality constant generated in the process of calculation.

In some cases, when the intrinsic reference of the camera, K, is not able to be determined, and the 3D coordinates of the eyeball center are not specified, the following approximate method may be adopted to calculate the synthetic virtual eyeball appearance. Firstly, set e(g) as 0, and then use a simple transformation equation:

$$p = s \begin{bmatrix} 1 & 0 & 0 \\ 0 & 1 & 0 \end{bmatrix} P$$

Herein, s is a simple scaling constant, which can be obtained by roughly estimating the iris diameter in the human eye image, and dividing the iris diameter by $D_i$.

In the above implementation process, it is realized that, for any physically feasible eyeball orientation (the line-of-sight direction) $g_n$, the 3D eyeball data is calculated, and is synthesized to obtain 2D pixel coordinates, after such processes, specifically, 2D image coordinates data of the iris center $c(g_n)$, and the iris contour point set $\{p_i(g_n)\}$ are obtained, in which, $\{p_i(g_n)\}$ represents a set composed of corresponding $p_i(g_n)$ after all the values are traversed by i. And all the $g_n$ and the corresponding $c(g_n)$, and $\{p_i(g_n)\}$ are saved, so as to obtain the synthetic dataset of the virtual eyeball appearances under different line-of-sight direction.

Figure 3:
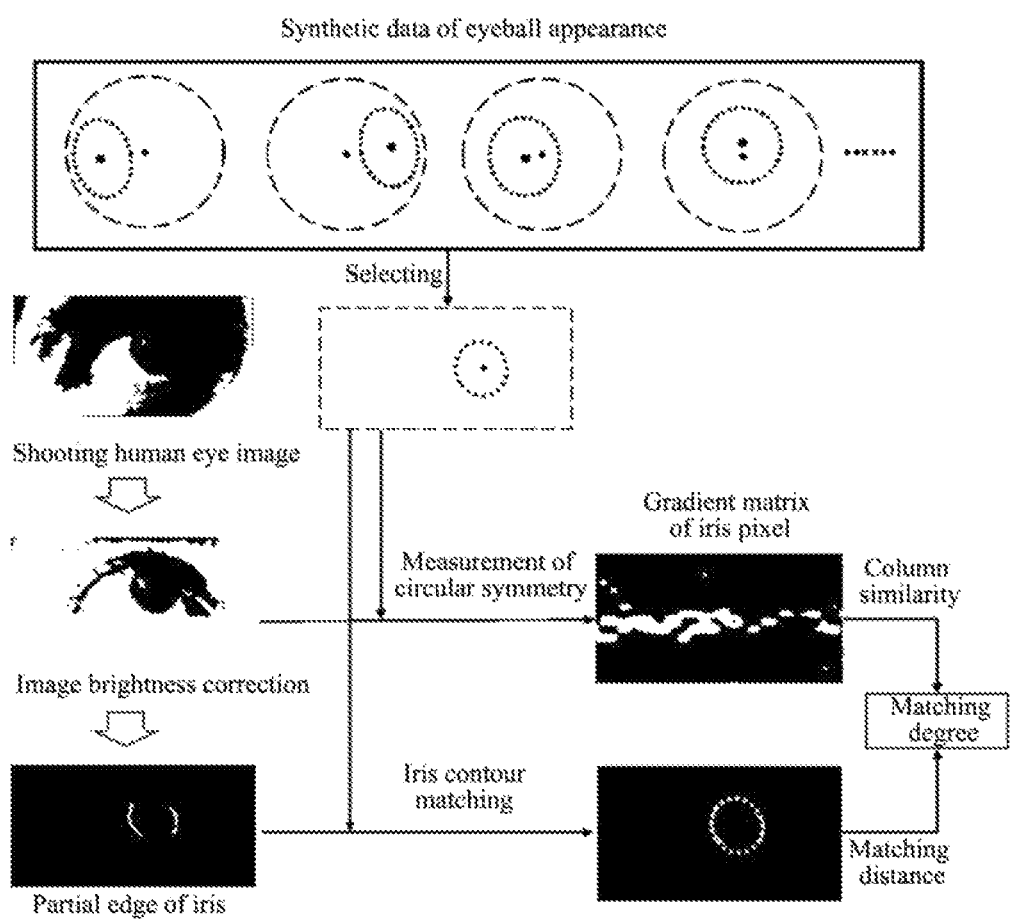
FIG. 3 is a diagram illustrating the matching of a human eye image with virtual eyeball appearance according to the present invention.

Referring to FIG. 3, which is a diagram illustrating the matching of a human eye image with virtual eyeball appearance according to the present invention, in which the synthetic dataset of virtual eyeball appearances under different line-of-sight direction, as described above, is used, for eyeball appearance matching with actually shot human eye images, so as to realize query and calculation of the eyeball orientation, namely, the 3D line-of-sight direction. And the specific implementation method is as follows.

Firstly, pretreatment to the actually shot human eye image is required before the line-of-light calculation. The pretreatment is conducted for two purposes: brightness correction of the human eye image shot under different conditions, as well as extraction of credible iris contour pixels from the human eye image. Concerning the brightness correction, firstly, histogram adjustment to the image brightness is conducted, so as to enhance the contrast ratio of the brighter region (such as the sclera) against the darker region (such as the iris and the cornea), and is implemented by the following operations:

$$I'_k = \begin{cases} I_k & \text{if } I_k < \text{median}(I_k) \\ \text{median}(I_k) & \text{the others} \end{cases}$$

$$I''_k = 255 \times \frac{I'_k \; \min_k(I'_k)}{\max_k(I'_k) \; \min_k(I'_k)}$$

Wherein, $I'_k$ and $I''_k$ are values of each pixel point in the image before and after the histogram adjustment, median( ) is a function for calculating the median. The extraction of the iris contour from the image after the brightness correction is specifically as follows: recording brightness variation range of the pixels in the image, and selecting the darkest region with a magnification of 0.8 as the threshold; selecting the region with the largest area, and enhancing the region by an image expansion operation, to obtain an approximate range of the iris region, and marking the central position of the region as o. Meanwhile, calculating one orientation mask from the original image, and as to the calculation method, for each pixel k, the mask value $M_k$ is as follows:

$$M_k = \begin{cases} 1 & \text{if angle between gradient of } I_k \text{ and} \\ & o \text{ indicative pixel } k \text{ is less than } 30° \\ 0 & \text{otherwise} \end{cases}$$

Analyze correlation between the mask and pixel points in the iris region. It can be concluded from observation that, gradient direction of the pixels on the iris contour from the darker iris region to the bright sclera region shall depart from the center o of the iris. Therefore, as far as the pixel k in the iris region is concerned, if the mask value $M_k$ of the point k is 1, then it indicates that the point is a potential pixel point on the iris contour. In addition, a possible iris contour region is constrained between two sector regions extending to the left and the right, with o as the center, so as to avoid the influence of the edges of the upper and lower eyelids. Finally, obtain the possible results of the iris contour. The incompleteness of the mask may lead to the existence of isolated pixels, therefore, determine connectivity of all pixels, and only reserve the non-isolated pixels, resulting in the final pixel collection of the iris contour.

Secondly, select the synthetic appearance data under a certain eyeball orientation $g_n$ from the virtual eyeball appearance dataset, and match the synthetic appearance data with the human eye image after brightness correction and the iris edge image. The matching is conducted in accordance with the two following principles:

1) circular symmetry measuring: measuring the circular symmetry of the pixel gradient of the human eye image in the iris contour region. The calculation method is carried out by representing the image with polar coordinates. In the representation with the polar coordinates, the horizontal axis represents the azimuth of the pixel point $p_i(g_n)$ on the iris relative to the iris center $c(g_n)$, and the vertical axis represents Euclidean coordinates of the line connecting the iris center $c(g_n)$ and the pixel point $p_i(g_n)$ on the iris. On such basis, the following method is adopted to collect data. Collecting a group of continuous pixel values across the iris contour, in the direction from $c(g_n)$ to $p_i(g_n)$ on the human eye image, in which the range of the collected region is proportional to the distance between $c(g_n)$ and $p_i(g_n)$. Filling the pixel values into the poplar coordinates, in which the horizontal coordinates are also the azimuths of $p_i(g_n)$, and the vertical coordinates are relative coordinates of the group of the pixels after arrangement thereof from the inside of the iris contour outward, therefore, the filling results in a vertical column. After completing the filling of each column under the polar coordinates, calculating the vertical gradient thereof to obtain a polar gradient map (a gradient matrix of the iris pixels). It could be concluded from observation that, ideal matching results of the iris edge can ensure structural similarity among columns of the matrix gradient, that is, values with higher strength appear in several same rows. And for the sake of quantitative measurement of consistency of each column of the matrix, indicators such as a rank of the matrix may be used to conduct the calculation. For example, the following concentration function may also be used to measure the similarity between the matrix columns:

$$RS = \frac{\sigma_1}{\sum(\sigma_l)},$$

$$\text{s.t. } PGM = U \begin{bmatrix} \sigma_1 & & \\ & \sigma_2 & \\ & & ... \end{bmatrix} V$$

Herein, the polar gradient map (PGM) is a matrix, $\{\sigma_l\}$ is a singular value, wherein l=1, 2, . . . , U and V are two matrixes generated after PGM matrix is subject to singular value decomposition. A larger RS value indicates a better matching.

2) iris contour matching: performing direct matching of the pixel set $\{q_j\}$ on the iris contour edge extracted from the human eye image with the iris contour $\{p_i(g_n)\}$ of the synthetic data of the virtual eyeball appearance. And due to the fact that the iris derived from the synthetic data may differ from the actually shot iris in the dimension, the present invention proposes a robust contour matching technique to solve this problem. In particular, the following matching criteria are proposed:

$$ICF = \sum_j 1 \sum_j \sigma_j$$

Wherein, $$\sigma_j = \begin{cases} 1, & \text{if } \min_i(\|q_j\ p_i(g_n)\|_2) < \min_{i,j}(\|q_j\ p_i(g_n)\|_2) + \\ 0, & \text{otherwise} \end{cases}$$

$\| \|_2$ represents 2-norm calculation, is a constant that tolerates small distance errors, and can be set as 2 pixels. The distances between the iris contour edge points in the image and the iris contour of the virtual eyeball data are calculated, and at the same time, the number of the cases where the distances are different from the other distances is counted by the above equation. Therefore, an ideal match should make all the distances equal to each other, namely, ICF is 0, a requirement a poor match is incapable of. The larger the ICF value, the poor the matching results. And the matching criterion does not requires that the pixels on the iris edge in the human eye image completely coincide with the iris contour of the synthetic data, only requires that the distances at all positions are equal (be of the same shape), thus solving the problem of different dimensions of the two cases.

In combination with the criterions under which the circular symmetry measurement and the iris contour matching are carried out, a method for comprehensive measurement of the matching degree between the human eye image and the virtual eyeball appearance is RS λ ICF, wherein λ is set as 0.01, for balancing the weights of these two items.

Figure 4:
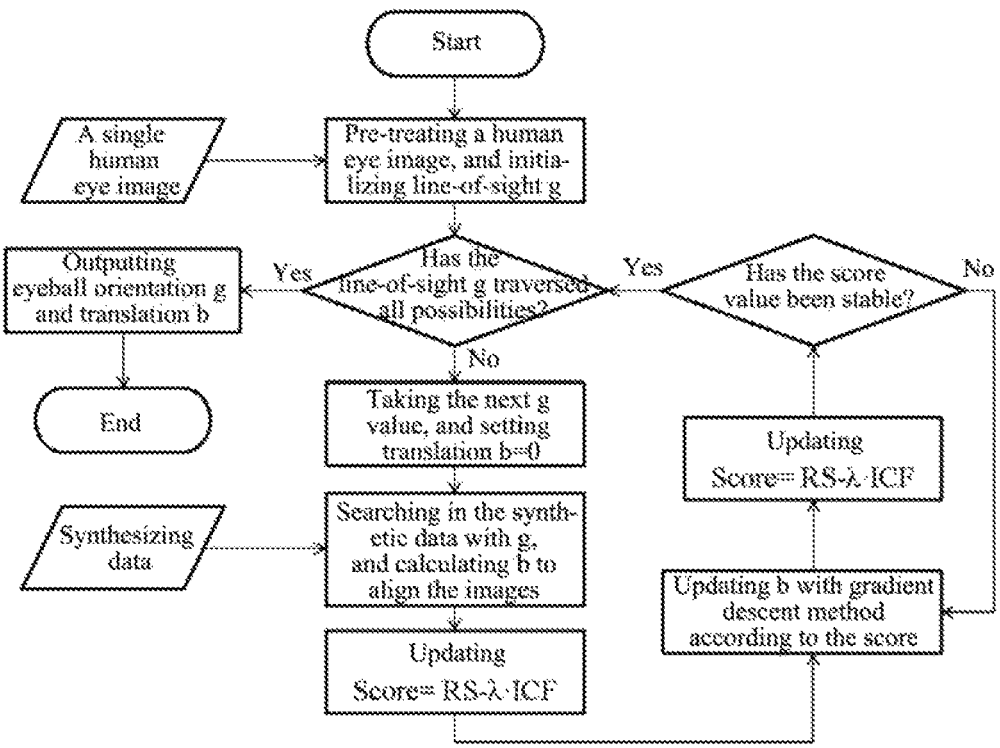
FIG. 4 is a flowchart illustrating calculation of the line-of-sight direction based on a single human eye image according to the present invention.

Referring to FIG. 4, which is a flowchart illustrating calculation of the line-of-sight direction based on a single human eye image according to the present invention, the specific implementation process for calculating the line-of-sight direction based on a single human eye image will be discussed in conjunction with the specific relative technology described above.

Firstly, input a single human eye image, conduct initial processing of the image, to obtain a human eye image with corrected brightness, and obtain a set of credible pixels on the iris contour edge from the human eye image. After that, in order to calculate the unknown line-of-sight direction g, specify a searching criterion and scope of the line-of-sight direction, and traverse the possible line-of-sight directions one by one.

Assume g is given a new value, then set the relative translation vector as b=0. Then, select data such as iris appearance corresponding to the line-of-sight direction which is the most approximate to g, from the synthetic dataset of the virtual eyeball appearance. Calculating score=RS λ ICF, and conducting optimal updating of b via gradient descent method under the criteria of a largest score value, repeating the step, until the value of b is stable. Finally, select the next value of g.

When the value of g has been traversed and no more new values, output the eyeball orientation g and the relative translation vector b corresponding to the largest score value during the whole calculation process which are the final output results, wherein the eyeball orientation g is also the 3D line-of-sight direction.

Figure 5:
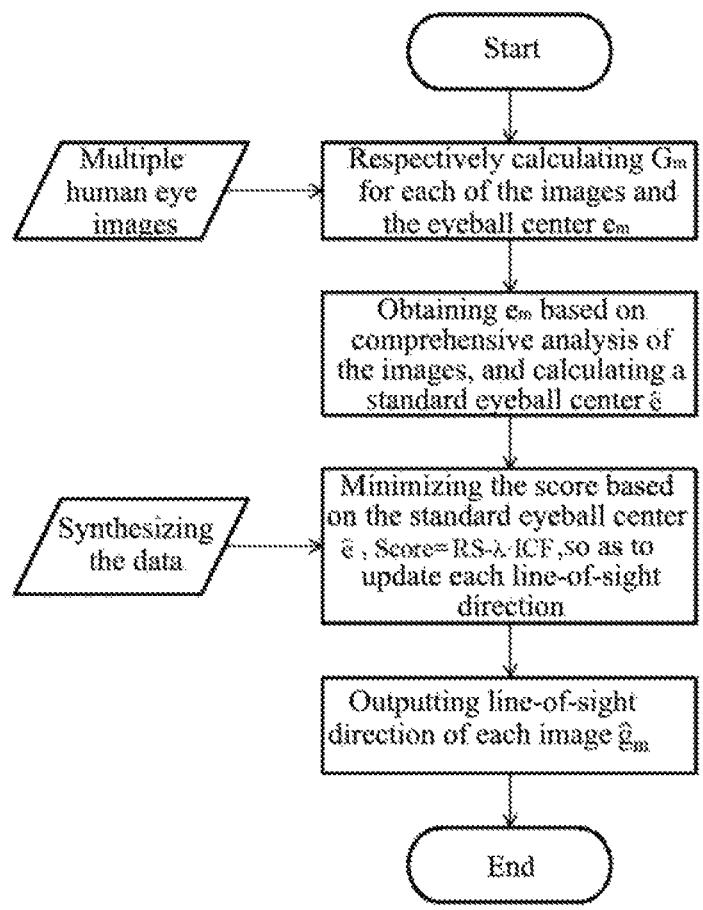
FIG. 5 is a flow chart illustrating joint optimization of the line-of-sight direction based on multiple human eye images according to the present invention.

Overall, the process solves the following optimization problems:

$$\{g,b\} = \arg\max_{g \in \{g_n\}, b} \{RS(g,b) \lambda ICF(g,b)\}$$

λ is a weight parameter, and is set as 0.01, g and b are the line-of-sight direction and the relative translation to be calculated. Referring to FIG. 5, which is a flow chart illustrating joint optimization of the line-of-sight direction based on multiple human eye images according to the present invention, an implementation method for calculating the joint optimization of the line-of-sight direction using multiple human eye images is described as below, on the basis of the aforementioned calculation method of the line-of-sight direction based on a single human eye image. Firstly, using the same camera to continuously shoot multiple human eye images in a short time. It is possible for the images to be accurately aligned by simple translation or rotation, because the posture of the head of the user tends to be steady in a short time. After that, respectively calculate line-of-sight direction $g_m$ and the coordinates $e_m$ of the eyeball center of each image, using the above calculation method of the line-of-sight direction for a single image.

Since rotation of the eyeball doesn't change the position of the eyeball center when the multiple human eye images have all be aligned, all $e_m$ should correspond to the coordinates of the same real eyeball center, which is marked as e. Assume there is a total of M human eye images, then the average value thereof may be directly calculated as:

$$e = \frac{1}{M} \sum_{m=1}^{M} e_m$$

Further, in order to obtain a higher accuracy, only one credible subset in $\{e_m\}$ is expected to be used. Therefore, cluster all data in $\{e_m\}$, and select the largest subset therein to undergo weighted averaging, so as to obtain e.

After obtaining the coordinates e of the eyeball center, conducting optimization calculation again for each human eye image, and the optimization method is still intended to maximize the following function: score=RS λ ICF, which includes optimization criterions of both circular symmetry and the iris contour matching. The method differs from the above method in that, during the calculation of RS and ICF, the coordinates $e_m$ of the eyeball center, which would have taken any values without constraint, are compulsorily fixed as e, and the optimization calculation is carried out on such basis. And because the eyeball center e is fixed, an equivalent of binding the variables of eyeball orientation and the relative translation vector, which are originally independent, significantly narrowing the solution space; and meanwhile, conducting optimized search within a certain floating range (such as in the scope of ±15°), by using the result $g_m$ generated from independent calculation as an initial value, does not require traversing the entire solution space. Therefore, it is possible to obtain the optimized line-of-sight direction $\hat{g}_m$ quickly. Overall, the joint optimization process solves the following problem:

$$\hat{g}_m = \arg\max_{g \in \{g_n\}, b} \{RS(g,e) \lambda ICF(g,e)\} \text{ s.t. } \arccos(g\ g_m) < 15°$$

Wherein, the 3D line-of-sight direction $\hat{g}_m$ is the final output targeted at the $m^{th}$ image.

In conclusion, the novel optimization matching criterion of the eyeball appearance of the present invention, effectively reduces effects of uncontrollable factors, such as image scaling and noise on the results; and a joint optimization method is invented for the case of continuously shooting multiple human eye images, so as to further improve the calculation accuracy. One of the applications of the present invention is virtual reality and human computer interaction, under the principle that, shooting eye images of a user, and calculating the line-of-sight direction of the user enable interaction with an intelligent system interface or a virtual realistic object. The present invention can also be widely used in training, games and entertainment, video surveillance, medical care and other fields.

What is described above is only one representative embodiment of the present invention, and any equivalent transformation made on the basis of the technical schemes of the present invention shall fall within the protection scope thereof.

What is claimed is:

1. A calculation method of line-of-sight direction based on analysis and match of iris contour in human eye image, comprising the following steps:
    (1) constructing a sphere eyeball model, traversing eyeball orientations with different physical feasibilities, generating 2D virtual eyeball appearances with different orientations by geometric calculation, and storing all the eyeball orientations and corresponding virtual eyeball appearance data in a dataset for use in specific applications;
    (2) during application, firstly shooting a facial image of a user, fixing on a left-eye or right-eye region, pre-treating a human eye image, completing brightness correction and extracting pixels on iris edges in the human eye image;
    (3) regarding the shot and pre-treated human eye image and the virtual eyeball appearance data in the dataset, matching the human eye image with the virtual eyeball appearance data via a matching optimization algorithm of the human eye image and the virtual eyeball appearance data, wherein a matching result determines an orientation and a position of the eyeball which best match with the human eye image; and
    (4) regarding continuously shot human eye images, further conducting joint optimization on the basis of the eyeball appearance matching in step (3), on the condition that a central position of the eyeball remains unchanged, or that the human eye images have been aligned, and precisely and simultaneously calculating 3D line-of-sight direction corresponding to each image;
    wherein a method for the joint optimization in step (4), and the method for accurately calculating the 3D line-of-sight direction corresponding to each image simultaneously are as follows, under the assumption that central position of the eyeball remains unchanged or has been aligned when the images shot, conducting the matching of the human eye images with the virtual eyeball appearance in step (3), and calculating the eyeball orientation corresponding to each human eye image and the coordinates of the central position of the eyeball; excluding the central coordinates of the eyeball with obvious deviation therein, and conducting weighting calculation of standard coordinates of the eyeball center using the remaining coordinates; and individually carrying on with the optimization in step (3), while adding one optimization constraint, namely, coinciding the matched eyeball central coordinates as much as possible with the standard eyeball central coordinates, and updating the calculation results as the eyeball orientations in the human eye images, namely, the final results of the 3D line-of-sight direction.

2. The calculation method of line-of-sight direction based on analysis and match of iris contour in human eye image according to claim 1, wherein the virtual eyeball appearance data in step (1) are generated as follows, firstly, establishing a 3D sphere model of the eyeball, and adding important elements of a circular iris contour on the surface of the 3D sphere model; traversing different physically-feasible eyeball orientations, namely, different rotation angles around a horizontal axis and a vertical axis respectively, for each of the rotation angles, projecting a corresponding 3D virtual eyeball appearance to a 2D plane, namely, to a position just in front of the corresponding eyeball, and recording projected iris contour coordinates, eyeball central coordinates and 2D eyeball appearance data of the iris central coordinates; and storing all the eyeball orientations and the virtual eyeball appearance data corresponding to the eyeball orientations in the dataset.

3. The calculation method of line-of-sight direction based on analysis and match of iris contour in human eye image according to claim 1, wherein the matching optimization algorithm of the human eye image and the virtual eyeball appearance data in step (3) is as follows, matching parameters to be calculated are relative translation amount of the human eye image and the virtual eyeball appearance in a 2D image domain, and the eyeball orientation corresponding to the virtual eyeball appearance, and optimizing matching degree of the human eye image and the virtual eyeball appearance via finding the best values of the two matching parameters, so as to realize matching of the human eye image and the virtual eyeball appearance data.

4. The calculation method of line-of-sight direction based on analysis and match of iris contour in human eye image according to claim 3, wherein the matching degree is calculated by the following functional measurements:
    (31) measurement of circular symmetry: pixels in the proximity of the virtual eyeball iris contour in the human eye image have better circular symmetry, when the matching tends to become ideal; and
    (32) measurement of iris contour matching degree: calculating distances between pixels on the iris edge in the human eye image and the virtual eyeball iris contour, when the matching tends to become ideal, and the distances tend to become equal.

5. The calculation method of line-of-sight direction based on analysis and match of iris contour in human eye image according to claim 4, wherein the measurement of the circular symmetry in step (31) is conducted as follows, coordinates of the iris contour of the virtual eyeball appearance and coordinates of the central position of the iris corresponding to any one group of matching parameter may be determined; overlapping these coordinates onto the human eye image, via continuously sampling values of pixels on the human eye image, along both the positive and negative directions indicated by lines connecting the iris center of the virtual eyeball appearance and points on the iris contour, while taking the points as reference, so as to obtain 1D pixel column vectors, and the sampling region is proportional to the distances between the points on the iris contour of the virtual eyeball appearance and the iris center of the virtual eyeball appearance; sampling via traversing the points on the iris contour of the virtual eyeball appearance, and combining all the obtained 1D column vectors into a 2D matrix; and finally, calculating distribution consistency of each column of numeric of the matrix or a gradient matrix of the matrix in the vertical direction, the consistency may be measured in a matrix kernel function, the correlation coefficient of each column, the concentration of singular values, and the higher the consistency, the better the circular symmetry.

6. The calculation method of line-of-sight direction based on analysis and match of iris contour in human eye image according to claim 4, wherein the measurement of the iris contour matching degree in step (32) is conducted as follows, regarding any one group of matching parameters, determining coordinates of the iris contour of the virtual eyeball appearance corresponding to the matching parameters of the group; traversing the pixels extracted from the iris edge of the human eye image, and calculating the distances between the edge pixels and the iris contour of the virtual eyeball appearance; and reviewing distribution of the distances, in which the less the number of the distances which are significantly different from the others, the better the measurement result of the iris contour matching degree.

* * * * *